United States Patent
Takayama

(10) Patent No.: US 8,687,950 B2
(45) Date of Patent: Apr. 1, 2014

(54) ELECTRONIC APPARATUS AND DISPLAY CONTROL METHOD

(75) Inventor: Shunsuke Takayama, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/409,981

(22) Filed: Mar. 1, 2012

(65) Prior Publication Data

US 2012/0308193 A1 Dec. 6, 2012

(30) Foreign Application Priority Data

May 30, 2011 (JP) .................... 2011-121046

(51) Int. Cl.
*H04N 5/92* (2006.01)
*H04N 5/84* (2006.01)
*H04N 5/89* (2006.01)
*H04N 5/917* (2006.01)
*H04N 5/93* (2006.01)

(52) U.S. Cl.
USPC ............. 386/343; 386/326; 386/33; 386/332; 386/333; 386/334; 386/335; 386/336; 386/353

(58) Field of Classification Search
USPC ......... 386/326, 331, 332, 333, 334, 335, 336, 386/343, 353
See application file for complete search history.

(56) References Cited

U.S. PATENT DOCUMENTS

| 2011/0080470 A1 | 4/2011 | Kuno et al. | |
| 2011/0116771 A1 | 5/2011 | Ota et al. | |
| 2011/0254917 A1* | 10/2011 | Schaffer et al. | 348/43 |
| 2012/0056990 A1 | 3/2012 | Yoshie | |
| 2012/0068996 A1* | 3/2012 | Berestov et al. | 345/419 |
| 2012/0170909 A1* | 7/2012 | Chung et al. | 386/248 |
| 2012/0195356 A1* | 8/2012 | Yi et al. | 375/224 |

FOREIGN PATENT DOCUMENTS

| JP | 2005-110121 | 4/2005 |
| JP | 2008-103820 | 5/2008 |
| JP | 2010-278539 | 12/2010 |
| JP | 2011-081453 | 4/2011 |
| JP | 2011-097451 | 5/2011 |
| JP | 2012-054733 | 3/2012 |
| JP | 2012-054877 | 3/2012 |

OTHER PUBLICATIONS

Japanese Patent Application No. 2011-121046, First Office Action, mailed Jul. 10, 2012, (with English Translation).
Japanese Patent Application No. 2012-270360, First Office Action, mailed Sep. 3, 2013, (with English Translation).

* cited by examiner

*Primary Examiner* — Daquan Zhao
(74) *Attorney, Agent, or Firm* — Blakely, Sokoloff, Taylor & Zafman LLP

(57) ABSTRACT

According to one embodiment, an electronic apparatus, which play 2D video data or 3D video data, includes a 2Dto3D converter and a display controller. The 2Dto3D converter generates 3D video frames corresponding to 2D video frames in the 2D video data. The display controller controls displaying the 3D video frames on a screen if 3D play of the 2D video data has been requested, and controls displaying 3D video frames in the 3D video data if play of the 3D video data has been requested. The display controller controls displaying the 2D video frames on the screen if a change of a play speed has been requested during the 3D play of the 2D video data.

14 Claims, 7 Drawing Sheets

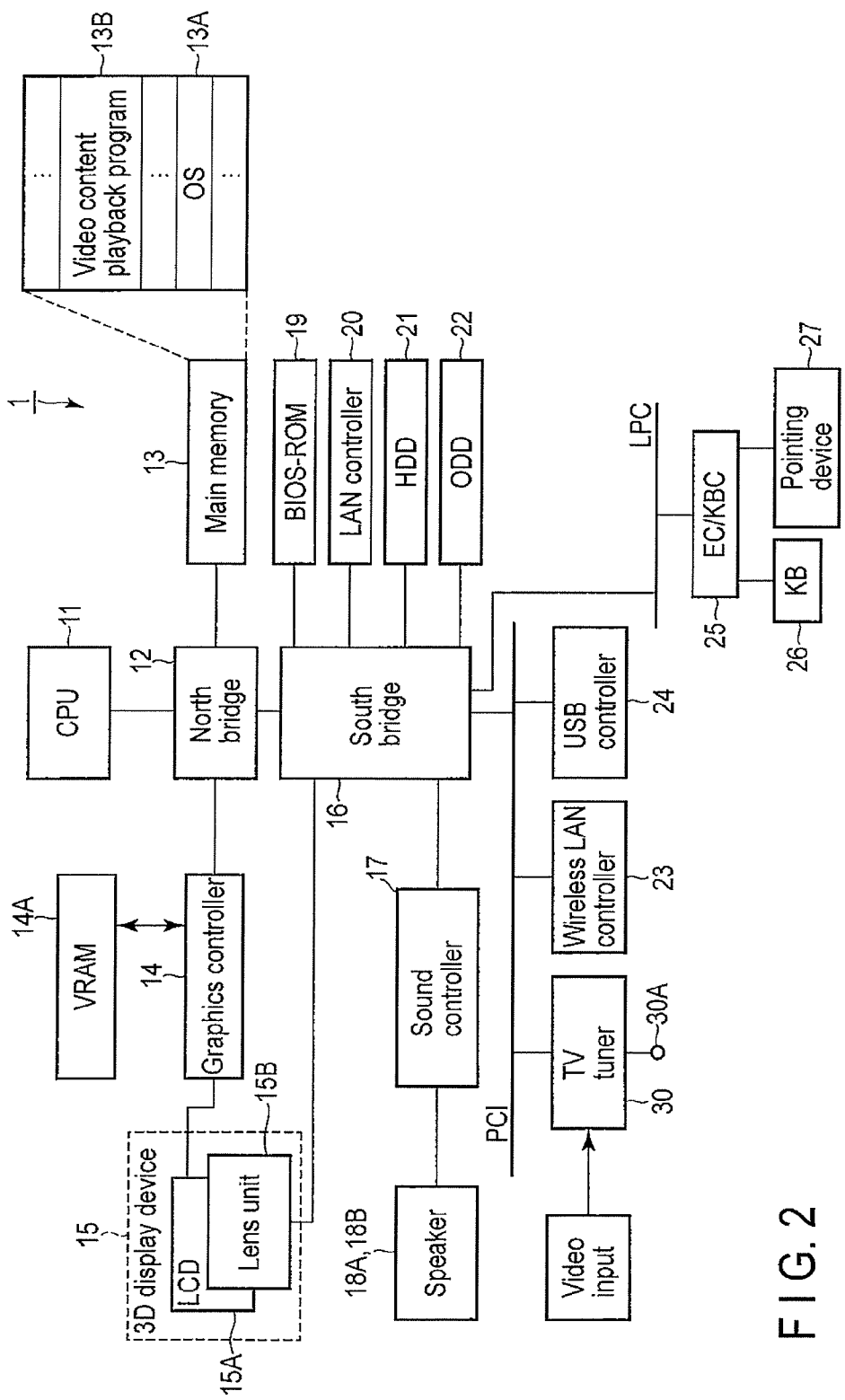
F I G. 2

| | Normal playback | Fast-forward /fast-rewind | Normal playback |
|---|---|---|---|
| 3D video display | 3D | 3D | 3D |
| 2Dto3D conversion display | 2D3D | 2D | 2D3D |
| 3Dto2D conversion display | 3D2D | 3D2D | 3D2D |
| 2D video display | 2D | 2D | 2D |

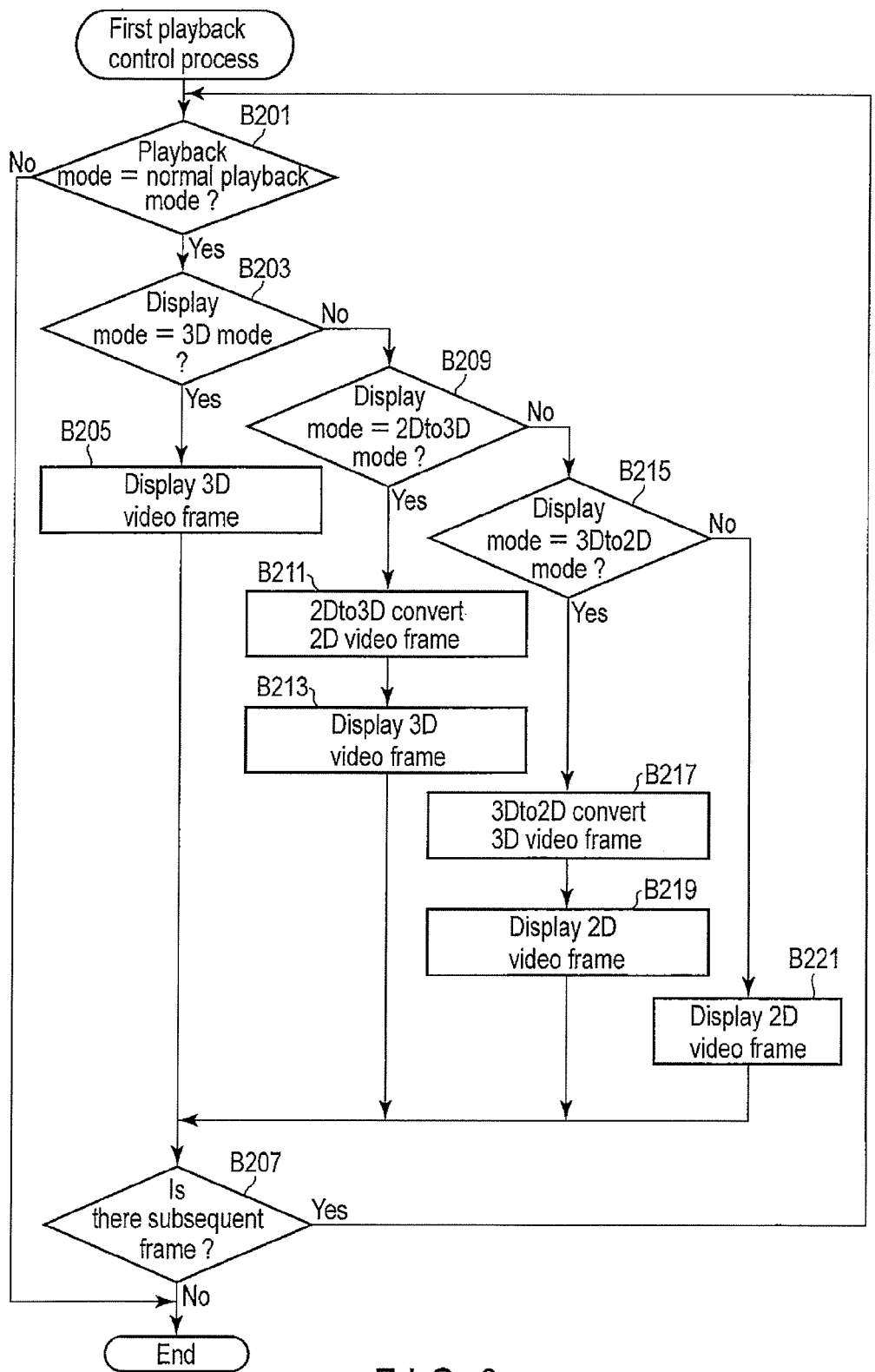
F I G. 6

ELECTRONIC APPARATUS AND DISPLAY CONTROL METHOD

CROSS-REFERENCE TO RELATED APPLICATIONS

This application is based upon and claims the benefit of priority from prior Japanese Patent Application No. 2011-121046, filed May 30, 2011, the entire contents of which are incorporated herein by reference.

FIELD

Embodiments described herein relate generally to an electronic apparatus which plays back video content, and a display control method which is applied to the electronic apparatus.

BACKGROUND

In recent years, there are provided various video display apparatuses for viewing three-dimensional (3D) video. Such a video display apparatus can make a user perceive 3D video (stereoscopic video) by using left-eye video and right-eye video based on an eye separation distance or a viewing distance. The video display apparatus can display 3D video, for example, by displaying the left-eye video and right-eye video in 3D video content data, by a method corresponding to this video display apparatus.

In the meantime, in some cases, the user executes fast-forward or fast-rewind (fast-backward) playback of video in order to quickly search for a part to be viewed from currently displayed video. For example, by making shorter the display time of each video frame in the video than at a time of normal playback, the fast-forward playback or fast-rewind playback of the video is executed. However, when 3D video is displayed, it is possible that stereoscopic by the user becomes difficult due to the shortening of the display time of each video frame. Thus, such a technique has been proposed that when fast-forward playback or fast-rewind playback has been instructed while 3D video is being displayed, two-dimensional (2D) video frames are generated by using 3D video frames and the generated 2D video frames are displayed on the screen.

However, since the video displayed on the screen is changed from 3D video to 2D video by instructing fast-forward playback or fast-rewind playback, the user may possibly feel unnaturalness of displayed video. It is thus desirable that even if fast-forward playback or fast-rewind playback has been instructed, the display of 3D video be maintained as long as possible when 3D video is displayed, and the display of 2D video be maintained as long as possible when 2D video is displayed.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exemplary block diagram illustrating an example of the system configuration of the electronic apparatus of the embodiment.

FIG. 6 is an exemplary flowchart illustrating an example of the procedure of a first playback control process which is executed by the electronic apparatus of the embodiment.

DETAILED DESCRIPTION

Various embodiments will be described hereinafter with reference to the accompanying drawings.

In general, according to one embodiment, an electronic apparatus, which play two-dimensional video data or three-dimensional video data, includes a 2Dto3D converter and a display controller. The 2Dto3D converter generates a plurality of three-dimensional video frames corresponding to a plurality of two-dimensional video frames in the two-dimensional video data. The display controller controls displaying the plurality of three-dimensional video frames generated by the 2Dto3D converter on a screen if three-dimensional play of the two-dimensional video data has been requested, and controls displaying a plurality of three-dimensional video frames in the three-dimensional video data if play of the three-dimensional video data has been requested. The display controller controls displaying the plurality of two-dimensional video frames in the two-dimensional video data on the screen if a change of a play speed has been requested during the three-dimensional play of the two-dimensional video data.

Figure 1:
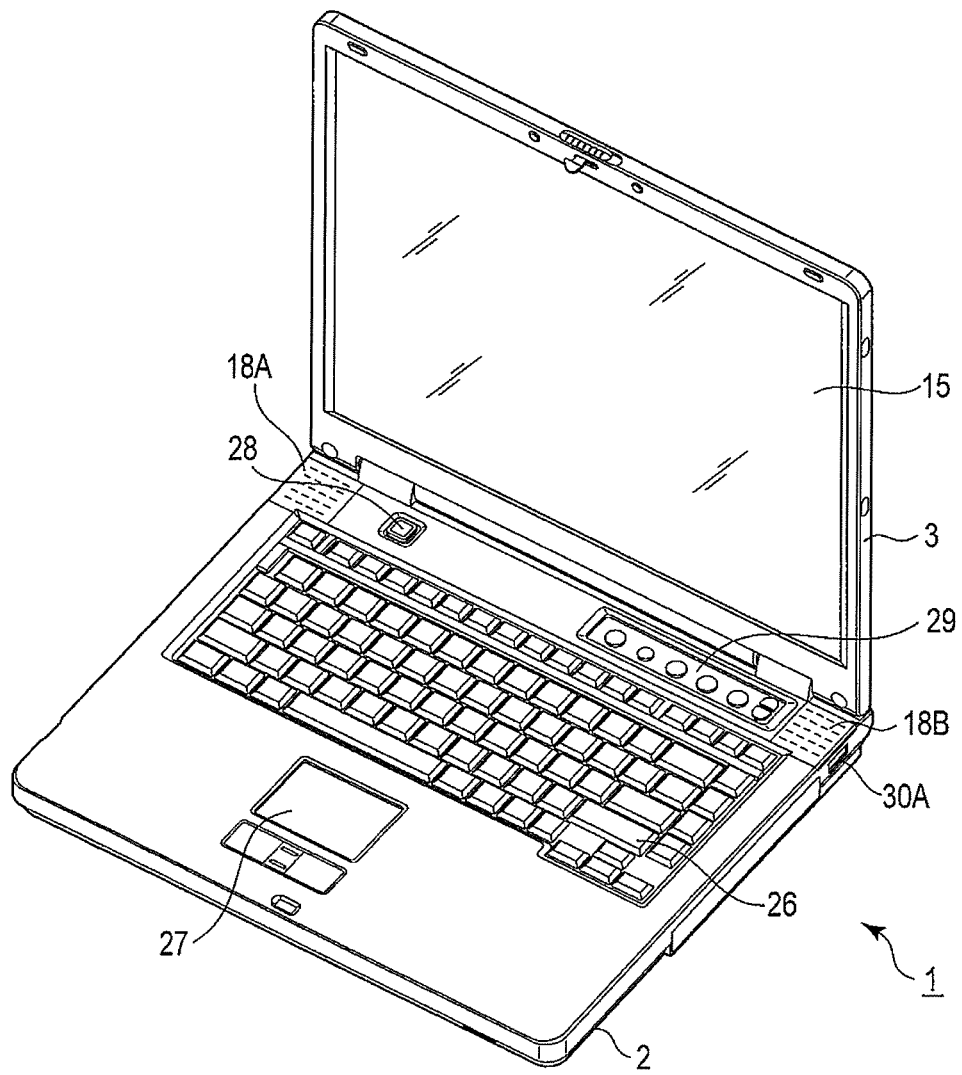
FIG. 1 is an exemplary perspective view illustrating an example of the external appearance of an electronic apparatus according to an embodiment.

FIG. 1 is a perspective view showing the external appearance of an electronic apparatus according to an embodiment. The electronic apparatus is realized, for example, as a notebook-type personal computer 1. In addition, this electronic apparatus may be realized as a television (TV) receiver, a recorder for storing video data (e.g. a hard disk recorder or a DVD recorder), a tablet PC, a slate PC, a PDA, a car navigation apparatus, or a smartphone.

As shown in FIG. 1, the computer 1 includes a computer main body 2 and a display unit 3.

A three-dimensional display device (3D display device) 15 is built in the display unit 3. The display unit 3 is attached to the computer main body 2 such that the display unit 3 is rotatable between an open position where the top surface of the computer main body 2 is exposed, and a closed position where the top surface of the computer main body 2 is covered. In addition, the 3D display device 15 includes a liquid crystal display (LCD) 15A and a lens unit 15B. The lens unit 15B is attached on the LCD 15A. The lens unit 15B includes a plurality of lens mechanisms for emitting, in predetermined directions, a plurality of light rays corresponding to a plurality of pixels included in an image displayed on the LCD 15A. The lens unit 15B is, for example, a liquid crystal gradient index (GRIN) lens which can electrically switch functions necessary for 3D video display. In the liquid crystal GRIN lens, a refractive index distribution is created by electrodes with use of a planar liquid crystal layer. Thus, 3D video and 2D video can be displayed on the screen. The 3D display device 15 displays left-eye video and right-eye video when 3D video is displayed, and displays 2D video when 2D video is displayed. Thus, the user can perceive 3D video when 3D video is displayed on the screen, and can perceive 2D video when 2D video is displayed on the screen.

The computer main body 2 has a thin box-shaped housing. A keyboard 26, a power button 28 for powering on/off the computer 1, an input operation panel 29, a pointing device such as a touch pad 27, and speakers 18A and 18B are disposed on the top surface of the housing of the computer main body 2. Various operation buttons are provided on the input operation panel 29. The buttons include operation buttons for controlling a TV function (viewing, recording, and playback of recorded broadcast program data/video data).

An antenna terminal 30A for TV broadcast is provided, for example, on a right-side surface of the computer main body 2. In addition, an external display connection terminal supporting, e.g. the high-definition multimedia interface (HDMI) standard is provided, for example, on a rear surface of the computer main body 2. This external display connection terminal is used for outputting video data (moving picture data) included in video content data, such as broadcast program data, to an external display.

FIG. 2 shows the system configuration of the computer 1.

The computer 1, as shown in FIG. 2, includes a CPU 11, a north bridge 12, a main memory 13, a graphics controller 14, a video memory (VRAM) 14A, 3D display device 15, a south bridge 16, a sound controller 17, speakers 18A and 18B, a BIOS-ROM 19, a LAN controller 20, a hard disk drive (HDD) 21, an optical disc drive (ODD) 22, a wireless LAN controller 23, a USB controller 24, an embedded controller/keyboard controller (EC/KBC) 25, keyboard (KB) 26, pointing device 27, and a TV tuner 30.

The CPU 11 is a processor for controlling the operation of the computer 1. The CPU 11 executes an operating system (OS) 13A and an application program, such as a video content playback program 13B, which are loaded from the HDD 21 into the main memory 13. The video content playback program 13B is software having a function for viewing video content data. The video content data includes 2D video data for displaying 2D video, or 3D video data for displaying 3D video. Thus, the video content playback program 13B has a function for viewing 2D video, and a function for viewing 3D video. The video content playback program 13B executes a live playback process for viewing broadcast program data received by the TV tuner 30, a recording process for recording the received broadcast program data in the HDD 21, a playback process for playing broadcast program data/video data which is recorded in the HDD 21, and a playback process for playing video content data received via a network. In addition, the video content playback program 13B can play video content data which is stored in storage media such as a DVD, or in a storage device such as a hard disk.

Further, the video content playback program 13B converts 2D video, which is included in video content data, to 3D video in real time, and displays the 3D video on the screen (the screen of the 3D display device) 15. The video content playback program 13B can two-dimensional to three-dimensional (2Dto3D) convert various content data (e.g. broadcast program data, video data stored in storage media or storage devices, or video data received from a server on the Internet).

For the display of 3D video, use may be made of the 3D display device 15 by a naked-eye stereoscopic method (e.g. an integral imaging method, a lenticular method, or a parallax barrier method). In the naked-eye stereoscopic method, a left-eye image and a right-eye image, which correspond to 3D video, are displayed on the 3D display device 15 with a predetermined arrangement. The user can perceive 3D video by the naked eyes by viewing video which is displayed on the 3D display device 15 by the naked-eye stereoscopic method.

For the display of 3D video, use may be made of, for example, a shutter method (also referred to as "time-division method"). In the 3D video display by the shutter method, a stereo-pair video including left-eye video data and right-eye video data is used. The LCD 15A is driven at a refresh rate (e.g. 120 Hz) which is double higher than the normal refresh rate (e.g. 60 Hz). The left-eye frame in the left-eye video data and the right-eye frame in the right-eye video data are alternately displayed on the LCD 15A with a refresh rate of, e.g. 120 Hz. For example, by using 3D glasses (not shown) such as liquid crystal shutter glasses, the user can view the image corresponding to the left-eye frame by the left eye and the image corresponding to the right-eye frame by the right eye. The 3D glasses may be configured to receive a synchronization signal, which indicates a display timing of the left-eye frame and right-eye frame, from the computer 1 by using, e.g. infrared. The left-eye shutter and right-eye shutter in the 3D glasses are opened/closed in synchronization with the display timing of the left-eye frame and right-eye frame on the LCD 15A.

Alternatively, for the display of 3D video, use may be made of a polarization method such as an Xpol (trademark) method. In this case, for example, interleaved frames, in which a left-eye image and a right-eye image are interleaved in units of a scanning line, are generated, and the interleaved frames are displayed on the LCD 15A. A polarizing filter covering the screen of the LCD 15A polarizes the left-eye image, which is displayed, for example, in odd-numbered lines on the screen of the LCD 15A, and the right-eye image, which is displayed in even-numbered lines on the screen of the LCD 15A, in different directions. By using polarization glasses, the user can view the left-eye image by the left eye and the right-eye image by the right eye.

In addition, the video content playback program 13B converts 3D video, which is included in video content data, to 2D video in real time, and displays the 2D video on the screen (the screen of the 3D display device) 15. The video content playback program 13B can three-dimensional to two-dimensional (3Dto2D) convert various 3D content data (e.g. broadcast program data, video data stored in storage media or storage devices, or video data received from a server on the Internet). The 3Dto2D conversion is used, for example, in order to make children of the age, for which viewing of 3D video is not desirable, view 2D video.

Furthermore, the video content playback program 13B includes a fast-forward/fast-rewind playback function for executing fast-forward playback or fast-rewind playback of a moving picture which is being played. The video content playback program 13B can fast-forward playback or fast-rewind playback 3D video or 2D video in accordance with an instruction by the user. In the fast-forward playback, an operation of skipping a predetermined number of video frames, which follow the currently displayed video frame, and displaying a video frame, which follows the skipped video frames, is repeated. Meanwhile, in the fast-rewind playback, an operation of skipping a predetermined number of video frames, which precede the currently displayed video frame, and displaying a video frame, which precede the skipped video frames, is repeated. In short, in the fast-forward playback and fast-rewind playback, each video frame after/ before a predetermined number of video frames is displayed, and thereby video can be played at a higher speed than at a time of normal playback.

Besides, the CPU 11 executes a basic input/output system (BIOS) that is stored in the BIOS-ROM 19. The BIOS is a program for hardware control.

The north bridge 12 is a bridge device which connects a local bus of the CPU 11 and the south bridge 16. The north bridge 12 includes a memory controller which access-controls the main memory 13. The north bridge 12 also has a function of communicating with the graphics controller 14.

The graphics controller 14 is a device which controls the LCD 15A that is used as a display of the computer 1. A display signal, which is generated by the graphics controller 14, is sent to the LCD 15A. The LCD 15A displays video based on the display signal.

The south bridge 16 controls devices on a Peripheral Component Interconnect (PCI) bus and devices on a Low Pin Count (LPC) bus. The south bridge 16 includes an Integrated Drive Electronics (IDE) controller for controlling the HDD 21 and ODD 22, and a memory controller which access-controls the BIOS-ROM 19. The south bridge 16 also has a function of communicating with the sound controller 17 and LAN controller 20.

Furthermore, the south bridge 16 can output to the lens unit 15B a control signal for executing such control as to set the lens unit 15B in either the 3D video display mode or the 2D video display mode, in accordance with, e.g. a request by the video content playback program 13B. The lens unit 15B is set in either the 3D video display mode or the 2D video display mode by varying, for example, the refractive index of parts of the liquid crystal layer in accordance with the control signal which has been output by the south bridge 16.

The sound controller 17 is a sound source device and outputs audio data, which is a target of playback, to the speakers 18A and 18B. The LAN controller 20 is a wired communication device which executes wired communication of, e.g. the Ethernet (trademark) standard. The wireless LAN controller 23 is a wireless communication device which executes wireless communication of, e.g. the IEEE 802.11 standard. In addition, the USB controller 24 communicates with an external device via a cable of, e.g. the USB 2.0 standard.

The EC/KBC 25 is a one-chip microcomputer in which an embedded controller for power management and a keyboard controller for controlling the keyboard (KB) 26 and pointing device 27 are integrated. The EC/KBC 25 has a function of powering on/off the computer 1 in accordance with the user's operation.

The TV tuner 30 is a reception device which receives broadcast program data that is broadcast by a television (TV) broadcast signal, and the TV tuner 30 is connected to the antenna terminal 30A. The TV tuner 30 is realized as a digital TV tuner which can receive digital broadcast program data of, e.g. ground digital TV broadcast. In addition, the TV tuner 30 has a function of capturing video data which is input from an external device.

Figures 3, 4:
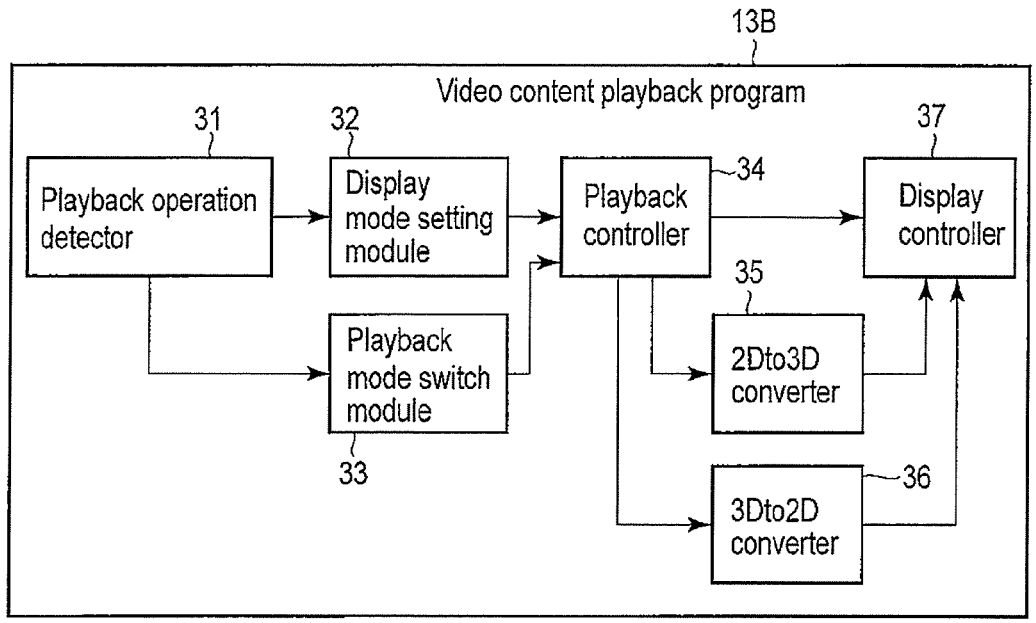
FIG. 3 is an exemplary block diagram illustrating an example of the configuration of a video content playback program which is executed by the electronic apparatus of the embodiment.
FIG. 4 illustrates examples of a display mode which is set by the electronic apparatus of the embodiment.

FIG. 3 shows an example of the functional configuration of the video content playback program 13B. The video content playback program 13B has a video playback function for playing video content data as 3D video or 2D video. In addition, the video content playback program 13B has a fast-forward/fast-rewind playback function for executing fast-forward/fast-rewind playback of 3D video or 2D video. In the fast-forward/fast-rewind playback function, for example, while video is being played, the video is played at a playback speed which is varied (or the video is played in a direction reverse to the direction of normal playback at a playback speed which is varied). The video content data, as described above, includes 2D video data for displaying 2D video, or 3D video data for displaying 3D video. The 2D video data includes a plurality of 2D video frames. In addition, the 3D video data includes a plurality of 3D video frames. The 3D video frame includes, for example, a side-by-side image in which a left-eye image and a right-eye image, which are sampled in a manner to have a half resolution in the horizontal direction, are arranged.

The video content playback program 13B includes a playback operation detector 31, a display mode setting module 32, a playback mode switch module 33, a playback controller 34, a 2Dto3D converter 35, a 3Dto2D converter 36 and a display controller 37.

The playback operation detector 31 detects various operations relating to the play of video content data. For example, responding to the user's pressing a button (an object of a GUI) displayed on the screen 15 or pressing a key in the keyboard 26, the playback operation detector 31 detects an operation (function) associated with the pressed button or key. The playback operation detector 31 detects, for example, an operation of instructing the start of playback (hereinafter also referred to as "normal playback") of video content data, an operation of instructing the start or end of fast-forward playback, and an operation of instructing the start or end of fast-rewind playback. In addition, the playback operation detector 31 may detect an operation of instructing the start of slow playback of video content data. Specifically, the playback operation detector 31 can detect an operation of instructing the varying of the playback speed of video content data, and can detect the playback speed which is varied. For example, after having instructed the start of normal playback of video content data, the user can instruct the start of fast-forward playback or fast-rewind playback in order to quickly search for a part to be viewed.

In addition, the playback operation detector 31 detects video content data which is set to be a target of playback. The video content data, which is the play target, is designated, for example, by the user. The user selects video content data, which is to be played, for example, from a list including a plurality of video content data.

When the designated video content data includes 2D video data, the playback operation detector 31 can detect a 2Dto3D conversion operation which instructs conversion of 2D video data to 3D video data. For example, a button for instructing 2Dto3D conversion is enabled only when 2D video data is included in video content data. Accordingly, when the operation of instructing 2Dto3D conversion has been detected, 3D video is displayed by using 2D video data. When this 2Dto3D conversion operation has not been detected, 2D video is displayed by using 2D video data. In addition, when the video content data includes 3D video data, the playback operation detector 31 can detect a 3Dto2D conversion operation which instructs conversion of 3D video data to 2D video data. For example, a button for instructing 3Dto2D conversion is enabled only when 3D video data is included in video content data. Accordingly, when the 3Dto2D conversion operation has been detected, 2D video is displayed by using 3D video data. When the 3Dto2D conversion operation has not been detected, 3D video is displayed by using 3D video data.

The playback operation detector 31 outputs the information indicative of a playback operation to the playback mode switch module 33. In addition, the playback operation detector 31 outputs to the display mode setting module 32 the information indicative of the playback operation and conversion operation and the information relating to the video content data that is the playback target.

Based on the information indicative of the playback operation, which has been output by the playback operation detector 31, the playback mode switch module 33 switches the playback mode of playing the video content data. As the playback mode, for example, one of "normal playback mode", "fast-forward mode" and "fast-rewind mode" is set. The "normal playback mode" indicates a mode in which video (2D video or 3D video), which is generated by using video content data, is played at a normal speed. The "fast-forward mode" indicates a mode in which video, which is generated by using video content data, is played at a speed higher than the normal speed in the same direction as the direction of normal playback. The "fast-rewind mode" indicates a mode in which video, which is generated by using video content data, is played at a speed higher than the normal speed in a direction reverse to the direction of normal playback.

Specifically, when the information indicative of the playback operation indicates the start of normal playback, the playback mode switch module 33 sets the playback mode to be the "normal playback mode". When the information indicative of the playback operation indicates the start of fast-forward playback, the playback mode switch module 33 sets the playback mode to be the "fast-forward mode". When the information indicative of the playback operation indicates the start of fast-rewind playback, the playback mode switch module 33 sets the playback mode to be the "fast-rewind mode". When the information indicative of the playback operation indicates the end of fast-forward playback, the playback mode switch module 33 sets the playback mode to be the "normal playback mode". When the information indicative of the playback operation indicates the end of fast-rewind playback, the playback mode switch module 33 sets the playback mode to be the "normal playback mode". The information indicative of the playback mode is stored, for example, in a predetermined area of the memory 13. The playback mode switch module 33 outputs the information indicative of the set playback mode to the playback controller 34.

Based on the information indicative of the playback operation and conversion operation and the information relating to the video content data that is the playback target, which have been output by the playback operation detector 31, the display mode setting module 32 sets the display mode of displaying video content data. For example, the display mode is set to be one of "3D mode", "3Dto2D mode", "2Dto3D mode" and "2D mode". The "3D mode" indicates a mode in which 3D video is displayed by using 3D video data included in video content data. The "3Dto2D mode" indicates a mode in which 2D video is displayed by using 3D video data included in video content data. The "2Dto3D mode" indicates a mode in which 3D video is displayed by using 2D video data included in video content data. The "2D mode" indicates a mode in which 2D video is displayed by using 2D video data included in video content data. The information indicative of the display mode is stored, for example, in a predetermined area of the memory 13. The display mode setting module 32 outputs the information indicative of the set display mode to the playback controller 34.

FIG. 4 illustrates examples of the display mode which is set by the display mode setting module 32. FIG. 4 illustrates examples of the display mode which is set while the playback mode transitions from the "normal playback mode" to "fast-forward mode" or "fast-rewind mode", and then returns to the "normal playback mode".

Specifically, when the video content data includes 3D video data and 3Dto2D conversion of the 3D video data is not instructed (i.e. when 3D video display is instructed), the display mode setting module 32 sets the display mode to be the "3D mode", regardless of whether the playback mode is the "normal playback mode", "fast-forward mode" or "fast-rewind mode". In short, when 3D video is displayed by using 3D video data, the display mode is kept to be the "3D mode" even if the playback mode is switched to the "fast-forward mode" or "fast-rewind mode".

When the video content data includes 2D video data and 2Dto3D conversion of the 2D video data is instructed (i.e. when 2D3D conversion display is instructed), the display mode setting module 32 sets the display mode to be the "2Dto3D mode" when the playback mode is the "normal playback mode", and sets the display mode to be the "2D mode" when the playback mode is the "fast-forward mode" or "fast-rewind mode".

To be more specific, when 2D3D conversion display is instructed, the display mode setting module 32 sets the display mode to be the "2Dto3D mode" when the playback mode has been set to be the "normal playback mode". Then, when the playback mode has been switched from the "normal playback mode" to the "fast-forward mode" or "fast-rewind mode", the display mode setting module 32 sets the display mode to be the "2D mode". Subsequently, when the playback mode has been restored from the "fast-forward mode" or "fast-rewind mode" to the "normal playback mode", the display mode setting module 32 restores the display mode to be the "2Dto3D mode".

When the video content data includes 3D video data and 3Dto2D conversion of the 3D video data is instructed (i.e. when 3D2D conversion display is instructed), the display mode setting module 32 sets the display mode to be the "3Dto2D mode", regardless of whether the playback mode is set to be the "normal playback mode", "fast-forward mode" or "fast-rewind mode". In short, when 2D video is displayed by using 3D video data, the display mode is kept to be the "3Dto2D mode" even if the playback mode is switched to the "fast-forward mode" or "fast-rewind mode".

When the video content data includes 2D video data and 2Dto3D conversion of the 2D video data is not instructed (i.e. when 2D video display is instructed), the display mode setting module 32 sets the display mode to be the "2D mode", regardless of whether the playback mode is set to be the "normal playback mode", "fast-forward mode" or "fast-rewind mode". In short, when 2D video is displayed by using 2D video data, the display mode is kept to be the "2D mode" even if the playback mode is switched to the "fast-forward mode" or "fast-rewind mode".

As has been described above, in the 3D video display (3D mode) and 2D video display (2D mode), the display mode is maintained even when video is fast-forward played or video is fast-rewind played. The reason for this is that in the 3D video display, 3D video is displayed by using 3D video frames including left-eye video and right-eye video (i.e. video with a parallax), and thus the amount of calculation necessary for display is unchanged between the time of normal playback and the time of fast-forward or fast-rewind playback. Similarly, in the 2D video display, since 2D video is displayed by using 2D video frames, the amount of calculation necessary for display is unchanged between the time of normal playback and the time of fast-forward or fast-rewind playback. Thus, the display mode is maintained regardless of the display mode.

In the 2D3D conversion display, when video is fast-forward played or fast-rewind played, the display mode is temporarily changed to the "2D mode", and is not set to be the "2Dto3D mode". The reason for this is that there is a possibility that the processing time necessary for the 2D3D conversion of converting a 2D video frame to a 3D video frame is longer than the time during which a video frame is displayed on the screen 15 at the time of fast-forward playback or fast-rewind playback. Specifically, in the 2D3D conversion, a plurality of depths corresponding to a plurality of pixels in a 2D video frame that is the playback target are calculated by analyzing a predetermined number of successive 2D video frames including the 2D video frame that is the playback target (e.g. three 2D video frames including the 2D video frame, which is the playback target, and 2D video frames preceding and following this 2D video frame). Based on a plurality of parallaxes corresponding to the calculated depths, a 3D video frame including left-eye video and right-eye video is generated. Because of this process with a great amount of calculation, it is possible that in the 2D3D conversion display, 3D video frames, which are 2D3D converted, cannot be generated in real time at the time of fast-forward playback or fast-rewind playback.

In addition, in the 2D3D conversion, as described above, the 3D video frame corresponding to the 2D video frame that is the playback target is generated by using a predetermined number of successive 2D video frames including the 2D video frame that is the playback target. However, in the fast-forward playback, such an operation is repeated that a predetermined number of video frames, which follow the currently displayed video frame, are skipped, and a video frame, which follows the skipped video frames, is displayed. In addition, in the fast-rewind playback, such an operation is repeated that a predetermined number of video frames, which precede the currently displayed video frame, are skipped, and a video frame, which precedes the skipped video frames, is displayed. Thus, it is possible that a predetermined number of successive 2D video frames, which are necessary for generating a 3D video frame, cannot be obtained.

Hence, when video is fast-forward played or fast-rewind played in the "2Dto3D mode", the 3D video frame, which is to be displayed on the screen 15, cannot be generated, and the fast-forward playback or fast-rewind playback fails to be executed. To avoid this, in the 2D3D conversion display, when video is fast-forward played or fast-rewind played, the display mode is set to be not the "2Dto3D mode", but the "2D mode". When the playback of video is restored to the normal playback, the display mode is restored from the "2D mode", which has been temporarily set, to the "2Dto3D mode" which is the immediately prior display mode. Thereby, the user can continuously view the 3D video, which is obtained by the 2D3D conversion, without newly executing the operation of instructing the 2D3D conversion.

In the meantime, in the 2D3D conversion display, even when video is fast-forward played or fast-rewind played, the 2D3D conversion display may be maintained as long as possible. For example, when the speed of fast-forward/fast-rewind playback is a threshold (e.g. double speed) or less, or when the usage rate (usage amount) of resources in the computer 1 is a threshold or less (e.g. when the usage rate of the CPU 11 is a threshold or less or when the usage amount of the memory 13 is a threshold or less), or when the resolution of the 2D video frame included in the video content data is a threshold (e.g. 1280×1024 pixels) or less, the 3D video frame can be generated in real time, and therefore the display mode setting module 32 can keep the display mode to be the "2Dto3D mode". Besides, when the frame rate of video, which is displayed on the screen 15, is a threshold (e.g. 60 frames/second) or less, the user can properly stereoscopically view 3D video displayed on the screen 15, and therefore the display mode setting module 32 can keep the display mode to be the "2Dto3D mode".

In the 3D2D conversion mode, even when video is fast-forward played or fast-rewind played, the display mode is kept to be the "3Dto2D mode". The reason for this is that the processing time necessary for the 3D2D conversion of converting a 3D video frame to a 2D video frame is shorter than the time during which a video frame is displayed on the screen 15 at the time of fast-forward playback or fast-rewind playback. Specifically, in the 3D2D conversion, when fast-forward playback or fast-rewind playback is executed, a 2D video frame, which is 3D2D converted, can be generated in real time. In the 3D2D conversion, a 3D video frame, which is the playback target, is used to generate a 2D video frame corresponding to this 3D video frame. Specifically, in the 3D2D conversion, for example, either a left-eye image or a right-eye image, which is included in the 3D video frame that is the playback target, is enlarged double in the horizontal direction, thereby generating a 2D video frame. Thus, the video frame, which is displayed on the screen 15, can be generated in a shorter time period than in the 2D3D conversion. Accordingly, in the 3D2D conversion display, the display mode is kept to be the "3Dto2D mode" even when video is fast-forward played or fast-rewind played.

Based on the playback mode set by the playback mode switch module 33 and the display mode set by the display mode setting module 32, the playback controller 34 executes control so that the video of the set display mode may be played in the set playback mode. Specifically, when the playback mode is set to be the "normal playback mode", the playback controller 34 executes control so that the video content data may be normally played. When the playback mode is set to be the "fast-forward mode", the playback controller 34 executes control so that the video content data may be fast-forward played. When the playback mode is set to be the "fast-rewind mode", the playback controller 34 executes control so that the video content data may be fast-rewind played.

Next, a description is given of an operation in the case where video content data is normally played, and an operation in the case where video content data is fast-forward played or fast-rewind played.

When video content data is normally played, the playback controller 34 sets a plurality of video frames to be playback-target video frames in an order from the first video frame. To be more specific, when the display mode is the "3D mode", the playback controller 34 outputs to the display controller 37 a playback-target 3D video frame of a plurality of 3D video frames by using 3D video data in the video content data. When the display mode is the "2Dto3D mode", the playback controller 34 outputs to the 2Dto3D converter 35 a playback-target 2D video frame of a plurality of 2D video frames by using 2D video data in the video content data. When the display mode is the "3Dto2D mode", the playback controller 34 outputs to the 3Dto2D converter 36 a playback-target 3D video frame of a plurality of 3D video frames by using 3D video data in the video content data. When the display mode is the "2D mode", the playback controller 34 outputs to the display controller 37 a playback-target 2D video frame of a plurality of 2D video frames by using 2D video data in the video content data.

The 2Dto3D converter 35 converts 2D video data to 3D video data. In other words, the 2Dto3D converter 35 generates a 3D video frame corresponding to a 2D video frame. In the 2Dto3D conversion, for example, by analyzing 2D video data, a moving object, such as a person, is detected. Thereby, the foreground/background relationship between an object, a background, etc. included in the video is estimated. Thus, the 2Dto3D converter 35 analyzes a predetermined number of successive 2D video frames including a playback-target video frame, thereby calculating a plurality of depths of a plurality of pixels included in the playback-target video frame. The 2Dto3D converter 35 calculates a plurality of parallaxes corresponding to the calculated plural depths, based on an eye separation distance or a viewing distance. In short, the 2Dto3D converter 35 calculates a plurality of parallaxes corresponding to the plural pixels included in the playback-target 2D video frame. Then, using the calculated plural parallaxes, the 2Dto3D converter 35 generates a 3D video frame including a left-eye image and a right-eye image. The 2Dto3D converter 35 outputs the generated 3D video frame to the display controller 37.

In the meantime, the 2Dto3D converter 35 may store an analysis result of a predetermined number of 2D video frames, for example, in a predetermined area of the memory 13. By making use of the stored analysis result, it is possible to shorten the processing time for generating a 3D video frame corresponding to a subsequent playback-target 2D video frame.

The 3Dto2D converter 36 converts 3D video data to 2D video data. The 3D video data, as described above, includes a plurality of 3D video frames. The 3D video frame includes, for example, a side-by-side image in which a left-eye image and a right-eye image, which are sampled in a manner to have a half resolution in the horizontal direction, are arranged. Thus, the 3Dto2D converter 36 generates a 2D video frame, for example, by doubly enlarging, in the horizontal direction, either a left-eye image or a right-eye image, which is included in the playback-target 3D video frame. Then, the 3Dto2D converter 36 outputs the generated 2D video frame to the display controller 37.

Next, the display controller 37 displays, on the screen 15, a 2D video frame or 3D video frame which has been output by the playback controller 34, a 3D video frame which has been output by the 2Dto3D converter 35, or a 2D video frame which has been output by the 3Dto2D converter 36. When displaying a 3D video frame, the display controller 37 displays on the screen 15 a left-eye image and a right-eye image included in the 3D video frame. By the above-described structure, the user can view the video which is normally played.

In the meantime, when the display mode is the "3Dto2D mode", the playback controller 34 may output to the display controller 37 a playback-target 3D video frame of a plurality of 3D video frames, by using 3D video data included in the video content data. In this case, the display controller 37 displays a side-by-side image, which is included in the playback-target 3D video frame, as such on the screen 15. Specifically, a left-eye image and a right-eye image, which are arranged in the left-and-right direction, are displayed on the screen 15.

Next, a description is given of an operation in the case where video content data is fast-forward played or fast-rewind played. In the fast-forward playback, the speed of fast-forwarding video frames (e.g. double speed, triple speed, etc. of the normal play speed) is designated. Similarly, in the fast-rewind playback, the speed of fast-rewinding video frames is designated. For the purpose of simple description, it is assumed that fast-forward playback has been instructed while video content data is being normally played.

When video content data is fast-forward played, the playback controller 34 skips a predetermined number of video frames which follow the currently displayed video frame, and sets a video frame, which follows the skipped predetermined number of video frames, to be a playback-target video frame. After the set playback-target video frame has been displayed on the screen, the playback controller 34 similarly skips a predetermined number of video frames which follow this playback-target video frame, and sets a video frame, which follows the skipped predetermined number of video frames, to be a new playback-target video frame. By repeating the above-described operation, the video content data is fast-forward played. The playback controller 34 determines this predetermined number (the number of video frames which are skipped), based on the speed of fast-forward playback. For example, since one video frame is skipped at a double-speed, the playback controller 34 determines this predetermined number to be "1". In addition, for example, at a decuple-speed, nine video frames are skipped, and thus the playback controller 34 determines this predetermined number to be "9".

When the display mode is the "3D mode", the playback controller 34 outputs to the display controller 37 a playback-target 3D video frame of a plurality of 3D video frames by using 3D video data in the video content data. When the display mode is the "3Dto2D mode", the playback controller 34 outputs to the 3Dto2D converter 36 a playback-target 3D video frame of a plurality of 3D video frames by using 3D video data in the video content data. The 3Dto2D converter 36, as described, outputs to the display controller 37 a 2D video frame which has been generated by 3Dto2D converting the 3D video frame. In addition, when the display mode is the "2D mode", the playback controller 34 outputs to the display controller 37 a playback-target 2D video frame of a plurality of 2D video frames by using 2D video data in the video content data.

The display controller 37 displays, on the screen 15, the 2D video frame or 3D video frame which has been output by the playback controller 34, or the 2D video frame which has been output by the 3Dto2D converter 36. The display controller 37 displays the video frame on the screen 15, for example, for a time period which is equal to a time period in which the video frame is displayed on the screen 15 at the time of normal playback. Besides, the display controller 37 may display the video frame on the screen 15, for example, for a time period which is longer than the time period in which the video frame is displayed on the screen 15 at the time of normal playback. By the above-described structure, the user can view the video which is fast-forward played. When the fast-rewind playback of video content data has been instructed, the playback controller 34 executes the same operation, as described above, in a direction reverse to the direction of play of video by the normal playback, and thereby the user can view the video which is fast-rewind played.

When video is played at a speed lower than the speed of normal playback, that is, when video is slowly played, the display mode is kept to be the display mode at the time of the normal playback. The reason for this is that at the time of slow playback, for example, even when the display mode is set to be the "2Dto3D mode", 2D video frames which are necessary for 2D3D conversion are not skipped, and a 3D video frame which is to be next displayed can be generated during a period before the video frame that is displayed on the screen 15 is changed.

Figure 5:
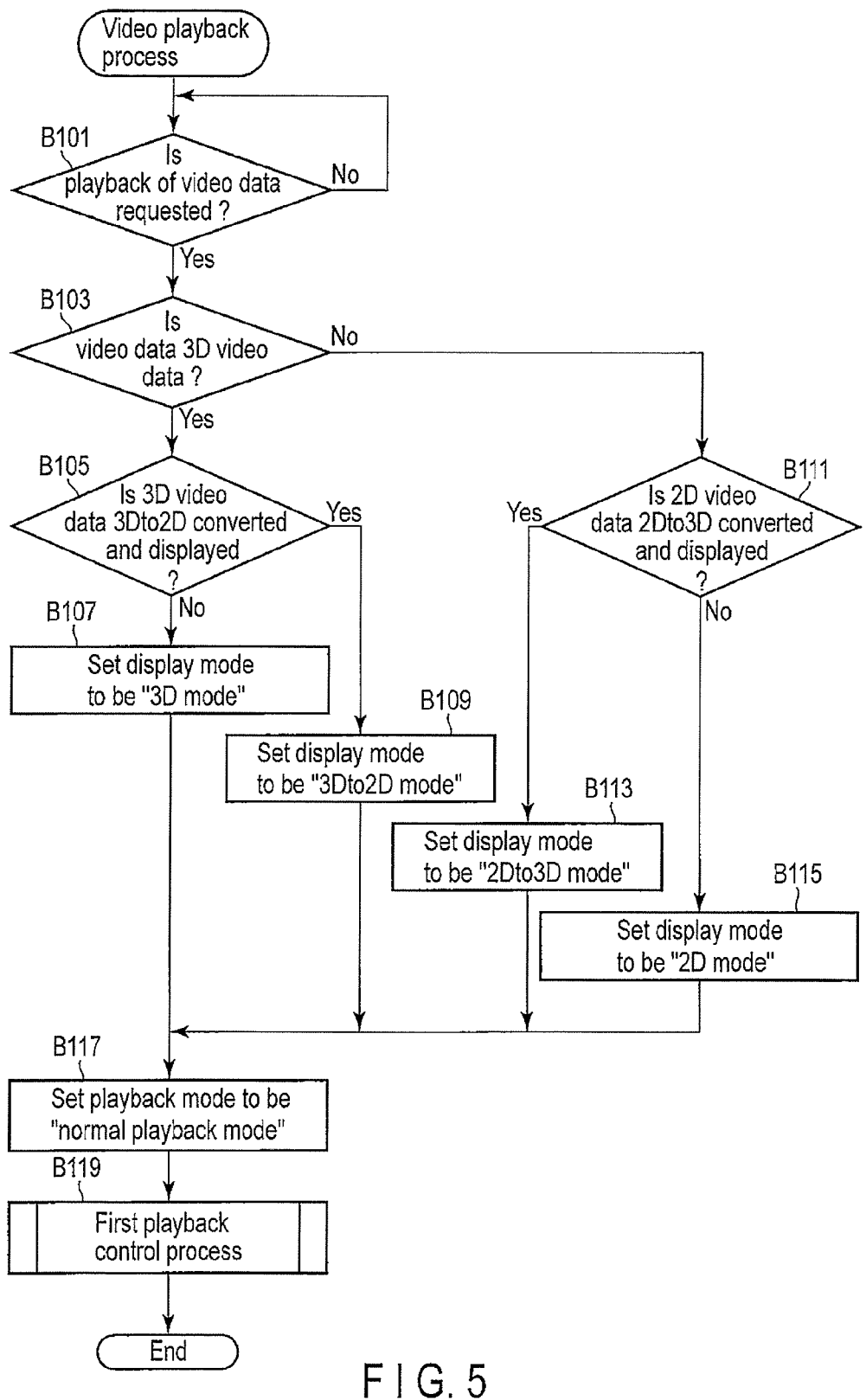
FIG. 5 is an exemplary flowchart illustrating an example of the procedure of a video playback process which is executed by the electronic apparatus of the embodiment.

Next, referring to a flowchart of FIG. 5, a description is given of an example of the procedure of a video playback process which is executed by the computer 1. In the video playback process, video data is played at a normal speed (frame rate).

To start with, the playback operation detector 31 determines whether playback of video content data has been requested (block B101). The video content data includes three-dimensional video data (3D video data) or two-dimensional video data (2D video data). The playback operation detector 31 detects, for example, that the video content data has been selected by the user, and the playback of the selected video content data has been instructed.

When playback of video content data has not been requested (NO in block B101), the process returns to block 8101, and it is determined once again whether playback of video content data has been requested.

When playback of video content data has been requested (YES in block B101), the display mode setting module 32 determines whether the video content data includes 3D video data or not (block B103). When the video content data includes 3D video data (YES in block B103), the display mode setting module 32 determines whether the 3D video data is to be 3Dto2D converted and displayed (block B105). Whether the 3D video data is to be 3Dto2D converted and displayed is determined, for example, by an instruction by the user. For example, the user presses a button for instructing 3Dto2D conversion, which is displayed on the screen, thereby instructing that 2D video is to be displayed by using the 3D video data.

When the 3D video data is not to be 3Dto2D converted and displayed (NO in block B105), the display mode setting module 32 sets the display mode to be the "3D mode" (block 8107). The "3D mode" indicates that 3D video is displayed on the screen by using playback-target 3D video data (video content data). On the other hand, when the 3D video data is to be 3Dto2D converted and displayed (YES in block B105), the display mode setting module 32 sets the display mode to be the "3Dto2D mode" (block B109). The "3Dto2D mode" indicates that 2D video is displayed on the screen by using playback-target 3D video data.

When the video content data does not include 3D video data (NO in block B103), that is, when the video content data includes 2D video data, the display mode setting module 32 determines whether the 2D video data is to be 2Dto3D converted and displayed (block B111). Whether the 2D video data is to be 2Dto3D converted and displayed is determined, for example, by an instruction by the user. For example, the user presses a button for instructing 2Dto3D conversion, which is displayed on the screen, thereby instructing that 3D video is to be displayed by using the 2D video data.

When the 2D video data is to be 2Dto3D converted and displayed (YES in block B111), the display mode setting module 32 sets the display mode to be the "2Dto3D mode" (block B113). The "2Dto3D mode" indicates that 3D video is displayed on the screen by using playback-target 2D video data. On the other hand, when the 2D video data is not to be 2Dto3D converted and displayed (NO in block B111), the display mode setting module 32 sets the display mode to be the "2D mode" (block B115). The "2D mode" indicates that 2D video is displayed on the screen by using playback-target 2D video data.

After the display mode is set in block B107, block B109, block B113 or block B115, the playback mode switch module 33 sets the playback mode to be the "normal playback mode" (block B117). The "normal playback mode" indicates a mode in which 2D video or 3D video is played at a normal frame rate (e.g. 30 frames/second). Then, the playback controller 34, 2Dto3D converter 35, 3Dto2D converter 36 and display controller 37 execute a first playback control process for playing video in the display mode and the playback mode, which have been set as described above (block B119).

A flowchart of FIG. 6 illustrates an example of the first playback control process.

To start with, the playback controller 34 determines whether the playback mode is the "normal playback mode" or not (block B201). When the playback mode is not the "normal playback mode" (NO in block B201), the playback controller 34 terminates the first playback control process.

When the playback mode is the "normal playback mode" (YES in block B201), the playback controller 34 determines whether the display mode is the "3D mode" or not (block B203). When the display mode is the "3D mode" (YES in block B203), the display controller 37 displays a playback-target 3D video frame on the screen (display) 15 (block B205). The video content data includes, for example, a plurality of video frames. The display controller 37 successively displays a plurality of video frames in an order from the first frame. Specifically, one video frame of the plurality of video frames is set to be a playback-target video frame. In the meantime, that the 3D video frame is displayed means, for example, that a left-eye video frame and a right-eye video frame are displayed.

When the display mode is not the "3D mode" (NO in block B203), the playback controller 34 determines whether the display mode is the "2Dto3D mode" or not (block B209). When the display mode is the "2Dto3D mode" (YES in block B209), the 2Dto3D converter 35 generates a 3D video frame by subjecting a playback-target 2D video frame to 2Dto3D conversion (block B211). Then, the display controller 37 displays the generated 3D video frame on the screen 15 (block B213).

When the display mode is not the "2Dto3D mode" (NO in block B209), the playback controller 34 determines whether the display mode is the "3Dto2D mode" or not (block B215). When the display mode is the "3Dto2D mode" (YES in block B215), the 3Dto2D converter 36 generates a 2D video frame by subjecting a playback-target 3D video frame to 3Dto2D conversion (block B217). Then, the display controller 37 displays the generated 2D video frame on the screen 15 (block B219).

When the display mode is not the "3Dto2D mode" (NO in block B215), that is, when the display mode is the "2D mode", the display controller 37 displays a playback-target 2D video frame on the screen 15 (block B221).

After the video frame is displayed in block B205, block B213, block B219 or block B221, the playback controller 34 determines whether there is a subsequent video frame which follows the playback-target video frame (block B207). When there is a subsequent video frame (YES in block 8207), the subsequent video frame is set to be a new playback-target video frame, and the above-described process is repeated to continue video playback. When there is no subsequent video frame (NO in block B207), that is, when the video has been played (displayed) to the end, the playback controller 34 terminates the first playback control process.

By the above-described process, the video content data is normally played in the set display mode.

Figure 7:
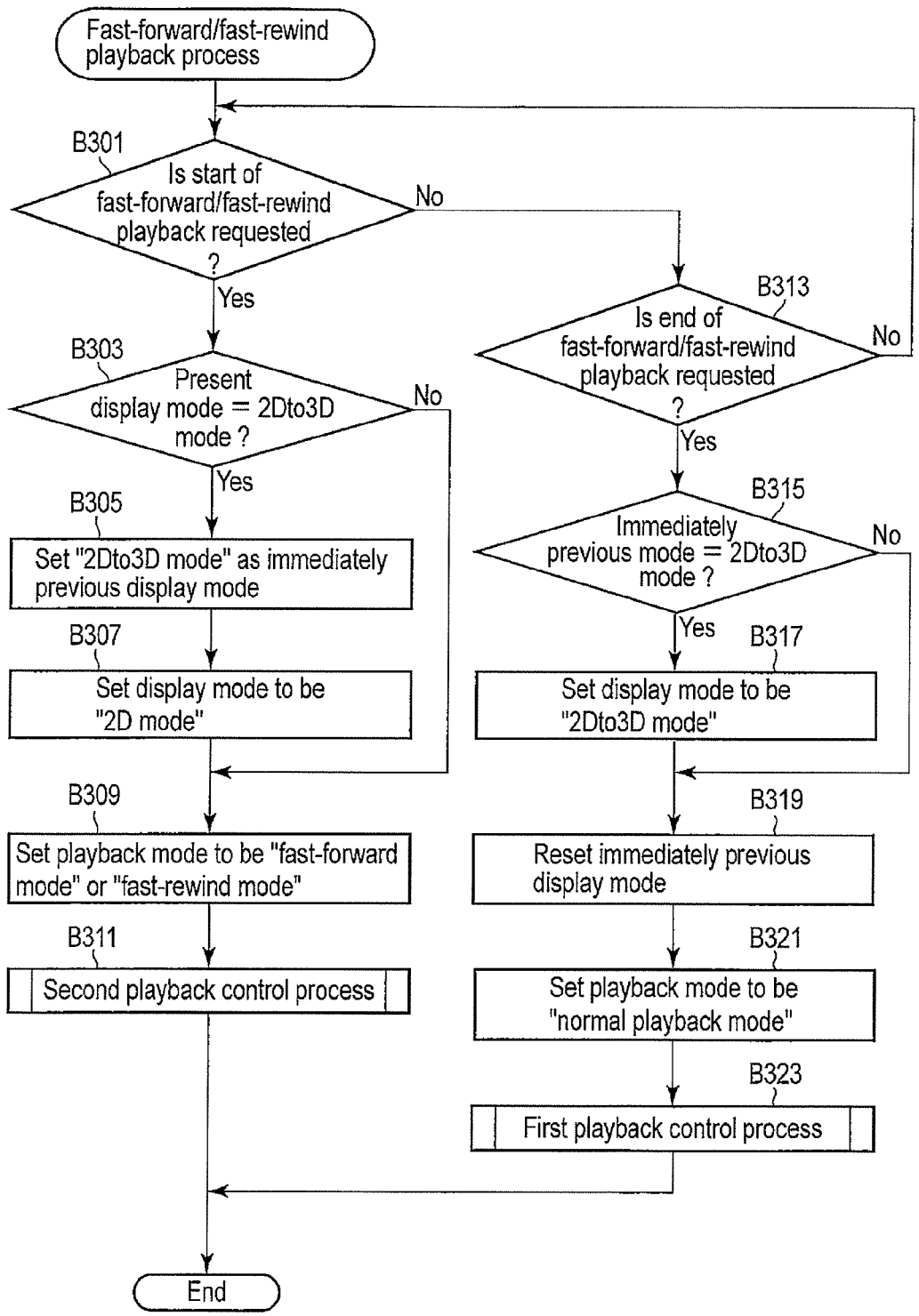
FIG. 7 is an exemplary flowchart illustrating an example of the procedure of a fast-forward/fast-rewind playback process which is executed by the electronic apparatus of the embodiment.

Next, referring to a flowchart of FIG. 7, a description is given of an example of the procedure of a fast-forward/fast-rewind playback process. In the fast-forward/fast-rewind playback process, for example, when fast-forward playback of video is requested while video is being normally played, the video is played at a speed higher than the normal speed. In addition, in the fast-forward/fast-rewind playback process, for example, when fast-rewind playback of video is requested while video is being normally played, the video is played at a speed higher than the normal speed in a direction reverse to the direction of normal playback.

To start with, the playback operation detector 31 determines whether the start of fast-forward playback of video or the start of fast-rewind playback of video has been requested (block B301). The playback operation detector 31 detects, for example, that the start of fast-forward playback of playback-target video has been instructed by the user while video is being normally played, or that the start of fast-rewind playback of playback-target video has been instructed by the user while video is being normally played.

When the start of fast-forward playback of video or the start of fast-rewind playback of video has been requested (YES in block B301), the display mode setting module 32 determines whether the present display mode is the "2Dto3D mode" or not (block B303). When the present display mode is the "2Dto3D mode" (YES in block B303), the display mode setting module 32 sets "2Dto3D mode" as an immediately previous display mode (block B305). Information indicative of the immediately previous display mode is stored, for example, in a predetermined memory area of the memory 13. Then, the display mode setting module 32 sets the display mode to be the "2D mode" (block B307). That is, when the present display mode is the "2Dto3D mode", the display mode is switched from the "2Dto3D mode" to the "2D mode".

On the other hand, when the present display mode is not the "2Dto3D mode" (NO in block B303), the display mode setting module 32 executes no process. In other words, when the present display mode is the "3D mode", "3Dto2D mode" or "2D mode", the present display mode is maintained.

Then, the playback mode switch module 33 sets the playback mode to be the "fast-forward mode" or "fast-rewind mode" (block B309). The "fast-forward mode" indicates a mode in which playback-target 2D video or 3D video is fast-forward played. The "fast-rewind mode" indicates a mode in which playback-target 2D video or 3D video is fast-rewind played. In the fast-forward playback, video is played by skipping video frames in accordance with a designated speed. For example, in double-speed fast-forward playback, every second video frame is displayed. Specifically, one frame, which follows the currently displayed video frame, is skipped, and one frame, which follows the skipped frame, is displayed. In the fast-rewind playback, video is reversely played by skipping video frames in accordance with a designated speed. For example, in double-speed fast-rewind playback, every second video frame is displayed. Specifically, one frame, which precedes the currently displayed video frame, is skipped, and one frame, which precedes the skipped frame, is displayed.

Then, the playback controller 34, 3Dto2D converter 36 and display controller 37 execute a second playback process (block B311). An example of the procedure of the second playback control process will be described later with reference to FIG. 8.

When the start of fast-forward playback of video or the start of fast-rewind playback of video has not been requested (NO in block B301), the playback operation detector 31 determines whether the end of fast-forward playback or the end of fast-rewind playback has been requested (block B313). The playback operation detector 31 detects, for example, that the end of fast-forward playback of video has been instructed or the end of fast-rewind playback of video has been instructed by the user while video is being fast-forward played or fast-rewind played. When the end of fast-forward playback or the end of fast-rewind playback has not been requested (NO in block B313), the process returns to block B301, and the playback operation detector 31 determines once again whether the start of fast-forward playback of video or the start of fast-rewind playback of video has been requested.

When the end of fast-forward playback or the end of fast-rewind playback has been requested (YES in block B313), the display mode setting module 32 determines whether the immediately previous display mode is the "2Dto3D mode" or not (block B315). When the immediately previous display mode is the "2Dto3D mode" (YES in block B315), the display mode setting module 32 sets the display mode to be the "2Dto3D mode" (block B317). Thereby, the display mode, which was switched from the "2Dto3D mode" to "2D mode" when the fast-forward playback or fast-rewind playback was started, is restored to the "2Dto3D mode". On the other hand, when the immediately previous display mode is not the "2Dto3D mode" (NO in block B315), the display mode setting module 32 executes no process. Specifically, when no value is set for the immediately previous display mode, the present display mode is maintained.

Then, the display mode setting module 32 resets the immediately previous display mode (block B319). The display mode setting module 32 clears the value which is set in the memory area corresponding to the immediately previous display mode. In addition, the playback mode switch module 33 sets the playback mode to be the "normal playback mode" (block B321). Subsequently, the playback controller 34, 2Dto3D converter 35, 3Dto2D converter 36 and display controller 37 execute the first playback control process which has been described with reference to FIG. 6.

Figure 8:
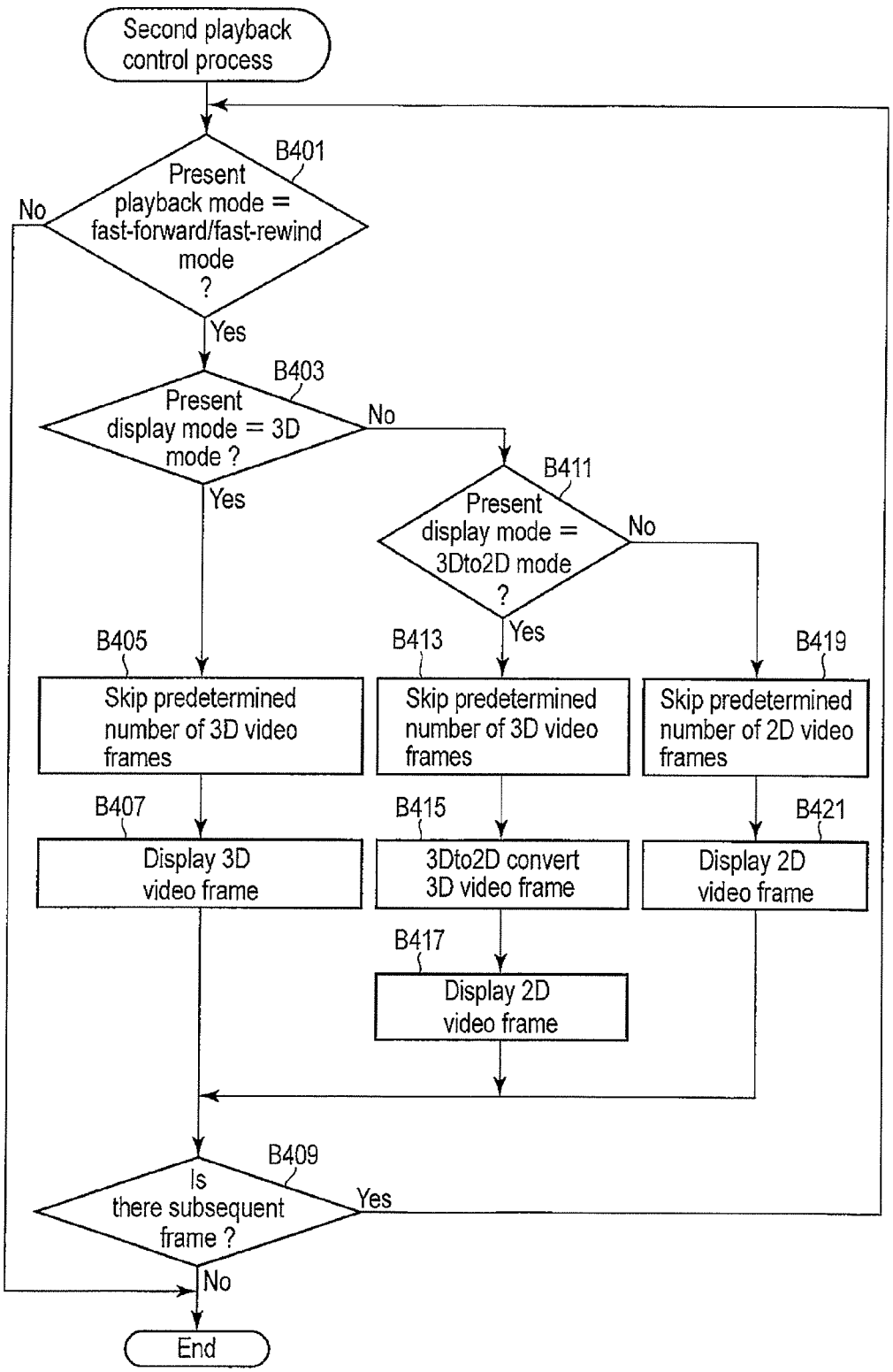
FIG. 8 is an exemplary flowchart illustrating an example of the procedure of a second playback control process which is executed by the electronic apparatus of the embodiment.

A flowchart of FIG. 8 illustrates an example of the procedure of the second playback control process. For the purpose of simple description, the process of fast-forward playback of video is described. It is assumed that when fast-forward playback has been instructed, the speed for fast-forward playback (e.g. double speed, triple speed) is designated.

To start with, the playback controller 34 determines whether the playback mode is the "fast-forward mode" or "fast-rewind mode" (block B401). When the playback mode is neither the "fast-forward mode" nor "fast-rewind mode" (NO in block B401), the playback controller 34 terminates the second playback control process.

When the playback mode is the "fast-forward mode" or "fast-rewind mode" (YES in block B401), the playback controller 34 determines whether the display mode is the "3D mode" or not (block B403). When the display mode is the "3D mode" (YES in block B403), the playback controller 34 skips a predetermined number of 3D video frames which follow the currently displayed 3D video frame (block B405). This predetermined number is, for example, a number of frames, which is determined based on the speed of fast-forward playback. Then, the display controller 37 displays on the screen 15 a 3D video frame which follows the skipped 3D video frames (block B407).

When the display mode is not the "3D mode" (NO in block B403), the playback controller 34 determines whether the present display mode is the "3Dto2D mode" or not (block B411). When the present display mode is the "3Dto2D mode" (YES in block B411), the playback controller 34 skips a predetermined number of 3D video frames which follow the currently displayed 3D video frame (block B413). Then, the playback controller 34 generates a 2D video frame by executing 3Dto2D conversion of a 3D video frame which follows the skipped 3D video frames (block B415). Then, the display controller 37 displays the generated 2D video frame on the screen 15 (block B417).

When the display mode is not the "3Dto2D mode" (NO in block B411), that is, when the display mode is the "2D mode", the playback controller 34 skips a predetermined number of 2D video frames which follow the currently displayed 2D video frame (block B419). Then, the display controller 37 displays a 2D video frame following the skipped 2D video frames on the screen 15 (block B421).

After the video frame is displayed in block B407, block B417 or block B421, the playback controller 34 determines whether there is a subsequent video frame which follows the playback-target video frame (block B409). When there is a subsequent video frame (YES in block B409), the subsequent video frame is set to be a new playback-target video frame, and the above-described process is repeated to continue video playback. When there is no subsequent video frame (NO in block B409), that is, when the video has been fast-forward played (displayed) to the end, the playback controller 34 terminates the second playback control process.

By the above-described process, the video content data is fast-forward played in the set display mode. Incidentally, when the fast-rewind playback of video content data has been instructed, the playback controller 34 executes the same operation as described above in a direction reverse to the direction of the normal playback of video, and thereby the video content data can be fast-rewind played in the set display mode.

In block B421, such control may be executed that while the 2D video frame is being displayed in the "2D mode", the user is unable to instruct the change of the display mode to the "2Dto3D mode". For example, when an operation of changing the display mode to the "2Dto3D mode" has been executed while the 2D video frame is being displayed in the "2D mode", the playback operation detector 31 may ignore this operation (i.e. maintain the display of the 2D video frame in the "2D mode"), and may display such a message that "Change to 3D display is disabled during fast-forward". In addition, for example, when an operation of changing the display mode to the "2Dto3D mode" has been executed while the 2D video frame is being displayed in the "2D mode", the display mode setting module 32 may change the display mode to the "2Dto3D mode" and the playback mode switch module 33 may switch the playback mode to the "normal playback mode", and thereby 3D video generated by 2D3D conversion may be normally played.

As has been described above, according to the present embodiment, proper video can be displayed during fast-forward playback or fast-rewind playback. The display mode setting module 32 maintains the original display mode as long as possible even when the video playback mode has been switched from the "normal playback mode" to "fast-forward mode" or "fast-rewind mode". Thereby, the user can view video, without feeling unnaturalness of video, which occurs due to switching of the display mode.

When the video playback mode has been switched from the "normal playback mode" to "fast-forward mode" or "fast-rewind mode", the display mode setting module 32 temporarily changes the display mode from the "2Dto3D mode" to "2D mode" if the display mode is the "2Dto3D mode". Thereby, the video can be displayed without a failure of the fast-forward playback or fast-rewind playback. Then, when the video playback mode is restored to the "normal playback mode" from the fast-forward mode" or "fast-rewind mode", the display mode setting module 32 changes the "2D mode", which is temporarily set, to the "2Dto3D mode". Thereby, the user can continuously view 3D video which is obtained by 2Dto3D conversion, without newly performing an operation of instructing 2Dto3D conversion.

All the procedures of the video playback process and fast-forward/fast-rewind playback process of the embodiment may be executed by software. Thus, the same advantageous effects as with the embodiments can easily be obtained simply by installing a program, which executes the procedures of the video playback process and fast-forward/fast-rewind playback process, into an ordinary computer through a computer-readable storage medium which stores the program, and executing this program.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus which plays two-dimensional (2D) video data or three-dimensional (3D) video data, comprising:
a first converter configured to generate a plurality of three-dimensional video frames corresponding to a plurality of two-dimensional video frames in the two-dimensional video data; and
a display controller configured to control displaying the plurality of three-dimensional video frames generated by the first converter on a screen if three-dimensional play of the two-dimensional video data has been requested, and to control displaying a plurality of three-dimensional video frames in the three-dimensional video data if play of the three-dimensional video data has been requested,
wherein the display controller is configured to control displaying the plurality of two-dimensional video frames in the two-dimensional video data on the screen if a change of a play speed has been requested during the three-dimensional play of the two-dimensional video data, and
the display controller is configured to maintain the display of the plurality of two-dimensional video frames on the screen and to control displaying on the screen a message indicating that the three-dimensional play of the two-dimensional video data is disabled during the change of the play speed, if the three-dimensional play of the two-dimensional video data has been requested while the plurality of two-dimensional video frames in the two-dimensional video data are being displayed on the screen by the change of the play speed having been requested during the three-dimensional play of the two-dimensional video data.

2. The electronic apparatus of claim 1, wherein the change of the play speed indicates either fast-forward play or fast-rewind play.

3. The electronic apparatus of claim 2, wherein the display controller is configured to control displaying the plurality of three-dimensional video frames in the three-dimensional video data on the screen by fast-forwarding the plurality of three-dimensional video frames, if the fast-forward play of the three-dimensional video data has been requested, and to control displaying the plurality of three-dimensional video frames in the three-dimensional video data on the screen by fast-rewinding the plurality of three-dimensional video frames, if the fast-rewind play of the three-dimensional video data has been requested.

4. The electronic apparatus of claim 1, wherein the display controller is configured to control displaying the plurality of two-dimensional video frames in the two-dimensional video data on the screen by repeatedly skipping a predetermined number of the plurality of two-dimensional video frames, if the change of the play speed has been requested during the three-dimensional play of the two-dimensional video data.

5. The electronic apparatus of claim 1, wherein the display controller is configured to control displaying the plurality of three-dimensional video frames generated by the first converter if an end of the change of the play speed has been requested during the three-dimensional play of the two-dimensional video data.

6. The electronic apparatus of claim 1, wherein the display controller is configured to control displaying the plurality of three-dimensional video frames generated by the first converter on the screen, if the change of the play speed has been requested during the three-dimensional play of the two-dimensional video data and the play speed to be changed is equal to or less than a threshold.

7. The electronic apparatus of claim 1, wherein the display controller is configured to control displaying the plurality of three-dimensional video frames generated by the first converter on the screen, if the change of the play speed has been requested during the three-dimensional play of the two-dimensional video data and a resolution of the two-dimensional video frames in the two-dimensional video data is equal to or less than a threshold.

8. The electronic apparatus of claim 1, wherein the display controller is configured to control displaying the plurality of three-dimensional video frames generated by the first converter on the screen, if the change of the play speed has been requested during the three-dimensional play of the two-dimensional video data and a frame rate, at which video frames are displayed on the screen, is equal to or less than a threshold.

9. The electronic apparatus of claim 1, wherein the display controller is configured to control displaying the plurality of three-dimensional video frames generated by the first converter on the screen, if the change of the play speed has been requested during the three-dimensional play of the two-dimensional video data and a resource usage rate of the electronic apparatus is equal to or less than a threshold.

10. The electronic apparatus of claim 1, further comprising a second converter configured to generate a plurality of two-dimensional video frames corresponding to the plurality of three-dimensional video frames in the three-dimensional video data,
wherein the display controller is configured to control displaying the plurality of two-dimensional video frames generated by the second converter on the screen, if two-dimensional play of the three-dimensional video data has been requested, and to control displaying the plurality of two-dimensional video frames generated by the second converter, if the change of the play speed has been requested during the two-dimensional play of the three-dimensional video data.

11. The electronic apparatus of claim 1, wherein the display controller is configured to control displaying the plurality of three-dimensional video frames generated by the first converter on the screen, at a play speed before the change of the play speed, if the three-dimensional play of the two-dimensional video data has been requested while the plurality of two-dimensional video frames in the two-dimensional video data are being displayed on the screen by the change of the play speed having been requested during the three-dimensional play of the two-dimensional video data.

12. The electronic apparatus of claim 1, wherein the display controller is configured to control displaying the plurality of two-dimensional video frames in the two-dimensional video data on the screen if a change of a play speed has been requested while the plurality of three-dimensional video frames generated by the first converter are displayed on the screen, and to control displaying the plurality of three-dimensional video frames in the three-dimensional video data on the screen if a change of a play speed has been requested while the plurality of three-dimensional video frames in the three-dimensional video data are displayed on the screen.

13. A display control method of controlling play of two-dimensional video data or three-dimensional video data, comprising:
generating a plurality of three-dimensional video frames corresponding to a plurality of two-dimensional video frames in the two-dimensional video data;
controlling displaying the generated plurality of three-dimensional video frames on a screen if three-dimensional play of the two-dimensional video data has been requested, and controlling displaying a plurality of three-dimensional video frames in the three-dimensional video data on the screen if play of the three-dimensional video data has been requested; and
controlling displaying the plurality of two-dimensional video frames in the two-dimensional video data on the screen if a change of a play speed has been requested during the three-dimensional play of the two-dimensional video data; and
maintaining the display of the plurality of two-dimensional video frames on the screen and controlling displaying on the screen a message indicating that the three-dimensional play of the two-dimensional video data is disabled during the change of the play speed, if the three-dimensional play of the two-dimensional video data has been requested while the plurality of two-dimensional video frames in the two-dimensional video data are being displayed on the screen by the change of the play speed having been requested during the three-dimensional play of the two-dimensional video data.

14. A computer-readable, non-transitory storage medium having stored thereon a computer program which is executable by a computer, the computer program being for controlling play of two-dimensional video data or three-dimensional video data, the computer program controlling the computer to execute functions of:
generating a plurality of three-dimensional video frames corresponding to a plurality of two-dimensional video frames in the two-dimensional video data;
controlling displaying the generated plurality of three-dimensional video frames on a screen if three-dimensional play of the two-dimensional video data has been requested, and controlling displaying a plurality of three-dimensional video frames in the three-dimensional video data on the screen if play of the three-dimensional video data has been requested; and
controlling displaying the plurality of two-dimensional video frames in the two-dimensional video data on the screen if a change of a play speed has been requested during the three-dimensional play of two-dimensional video data; and
maintaining the display of the plurality of two-dimensional video frames on the screen and controlling displaying on the screen a message indicating that the three-dimensional play of the two-dimensional video data is disabled during the change of the play speed, if the three-dimensional play of the two-dimensional video data has been requested while the plurality of two-dimensional video frames in the two-dimensional video data are being displayed on the screen by the change of the play speed having been requested during the three-dimensional play of the two-dimensional video data.

* * * * *